United States Patent

Woodson et al.

Patent Number: 5,286,457
Date of Patent: Feb. 15, 1994

[54] REACTOR WITH SURFACE AGITATOR FOR SOLUTION POLYMERIZATION PROCESS

[75] Inventors: Gary L. Woodson; Brian W. Walther; Brian G. Witt; Gary R. Marchand, all of Baton Rouge, La.

[73] Assignee: The Dow Chemical Company, Midland, Mich.

[21] Appl. No.: 858,812

[22] Filed: Mar. 27, 1992

Related U.S. Application Data

[62] Division of Ser. No. 710,632, Jun. 5, 1991, Pat. No. 5,120,805.

[51] Int. Cl.$^5$ ............... B01F 7/18; B01F 7/32
[52] U.S. Cl. ................ 422/135; 422/224; 422/225; 366/325; 366/329
[58] Field of Search ........... 422/135, 224, 225, 228; 366/329, 325; 526/88

[56] References Cited

U.S. PATENT DOCUMENTS

| | | | |
|---|---|---|---|
| 2,138,607 | 11/1938 | Larsen | 366/325 |
| 2,183,763 | 12/1939 | Brown | 366/329 |
| 2,385,128 | 9/1945 | Castner | 422/225 |
| 2,520,577 | 8/1950 | Tooley | 366/325 |
| 3,968,090 | 7/1976 | Shimada et al. | 526/88 |
| 4,594,228 | 6/1986 | Lambert, Jr. et al. | 422/135 |
| 4,798,131 | 1/1989 | Ohta et al. | 422/135 |
| 5,045,470 | 9/1991 | Kloss | 422/224 |
| 5,102,630 | 4/1992 | Lee | 422/135 |

Primary Examiner—Robert J. Warden
Assistant Examiner—T. A. Trembley

[57] ABSTRACT

A reactor for the solution polymerization of volatile monomers equipped with an agitator to cause splashing and droplet formation to reduce volatile monomer accumulation in the vapor space.

2 Claims, 1 Drawing Sheet

REACTOR WITH SURFACE AGITATOR FOR SOLUTION POLYMERIZATION PROCESS

CROSS-REFERENCE TO RELATED APPLICATION

This is a divisional of application Ser. No. 07/710,632 filed Jun. 5, 1991 now U.S. Pat. No. 5,120,805.

BACKGROUND OF THE INVENTION

The present invention relates to a process and reactor design for the polymerization of monomers in a nonaqueous system. More particularly the present invention relates to a reactor which is operated partially full, that is, a portion of the volume of the reactor is vapor space. The vapor space additionally contains an agitator which aids in reducing volatile monomer accumulating in the vapor space under certain reaction conditions. The reactor is particularly suited for use in an anionic polymerization process.

There are many known examples of solution polymerizations involving one or more volatile monomeric components. Often it is desired to control the degree of polymerization of one component of a reaction mixture. For example, in the polymerization of block copolymers containing one component that is relatively volatile, such as butadiene, it may be desired at some stage to polymerize a relatively pure block of such volatile monomer, and thereafter to continue the polymerization by adding a second monomer to the reactor to form a relatively pure second polymer block. In reactors containing a vapor space, it has been discovered that significant quantities of the volatile monomer may remain in the vapor space of the reactor after polymerization of the dissolved portion of the monomer is completed. Unless the quantity of monomer held in the vapor space is reduced, this remnant may subsequently reenter the reaction mixture and polymerize, thereby destroying the purity of later formed polymer blocks. This problem of residual volatile contamination may also occur in subsequent batch polymerizations utilizing the same reactor unless the reactor is thoroughly purged. In addition to the above problem of polymer contamination, the loss of quantities of volatile monomer into the vapor space of the reactor may result in an undesirable molecular weight variation from desired polymer composition and monomer contamination of the resulting polymer product.

Although a condenser may be employed to remove volatile components from the vapor space of a reactor, often even this technique is not adequate to completely remove the desired amount of volatile monomer. Thus, it would be desirable if there were provided a reactor having a vapor space suitable for use in the solution polymerization of volatile monomers that provides a means to reduce the concentration of such volatile monomers in the vapor space.

It would further be desirable if there were provided an anionic polymerization process that is characterized by a means for reducing the amount of volatile monomer that partitions into the vapor space.

SUMMARY OF THE INVENTION

According to the present invention there is provided a reactor suitable for use in the solution polymerization of a liquid reaction mixture comprising a volatile monomer, said reactor comprising a vessel having a vapor space and fitted with an inlet, outlet, and stirring means immersed in the liquid reaction mixture, said reactor characterized by the presence of a mechanical agitation means to interrupt the surface of the liquid reaction mixture so as to cause splashing and droplet formation thereby increasing the surface area available for vapor absorption and a reduction of volatile monomer concentration in the vapor space of the reactor.

Also provided according to the present invention is a process for the solution polymerization of a liquid reaction mixture comprising a volatile monomer in a reactor comprising a vessel having a vapor space and fitted with an inlet, outlet, and stirring means immersed in the liquid reaction mixture, said reactor characterized by the presence of a mechanical agitation means to interrupt the surface of the liquid reaction mixture so as to cause splashing and droplet formation thereby increasing the surface area available for vapor absorption and a reduction of volatile monomer concentration in the vapor space of the reactor.

DESCRIPTION OF THE PREFERRED EMBODIMENT

Figure 1:
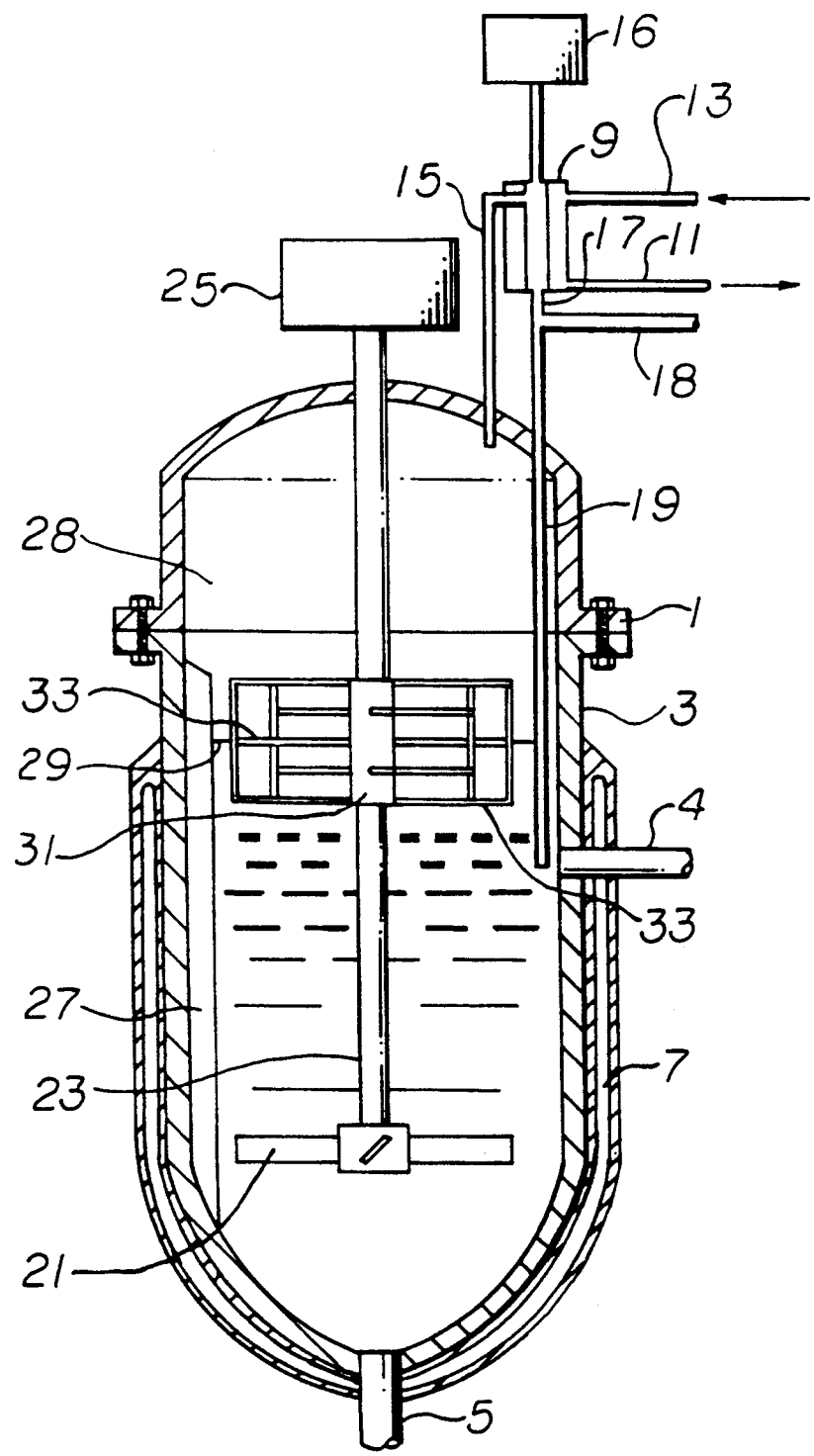
FIG. 1 illustrates a reactor according to the invention.

The invention is further illustrated by reference to FIG. 1 where there is illustrated a vertically disposed reactor, comprising top, 1, and bottom, 3, fitted with inlet, 4, outlet, 5, and a heating jacket, 7; for circulation of a heat transfer fluid for thermal control. Also fitted to the reactor is a condenser, 9, supplied with a circulating cooling fluid through connections at 11 and 13. The condenser is in operative communication with the reactor by means of an inlet, 15, which allows vapors to enter the condenser and discharge, 17, which allows condensate to return to the reactor. A pressure regulating means, 16, may be employed to improve the condensing system. Such pressure regulating means may be a means to control the pressure of the reactor contents such as a source of vacuum or venting, preferably to a monomer scavenging and environmental control system. Alternatively however, the pressure regulating means may be a control system to provide an increased or reduced condensation rate by the condenser. Additional monomer, initiator or other reaction components may be added to the returning condensate through line, 18, in operative communication with a drop tube, 19, for discharging condensate, initiator, and other reaction components beneath the surface of the reaction mixture, 29, in order to obtain rapid dispersal thereof.

The interior of the reactor is fitted with stirring means, 21, turned by means of a shaft, 23, connected to a source of rotational energy such as a motor driven gear reduction unit, 25, to provide sufficient stirring of the reaction mixture to ensure substantial homogeneity thereof. An agitation means, 31, in the embodiment of the invention illustrated in FIG. 1 is also fitted to shaft, 23, and agitates the surface of the reaction mixture to cause spray and droplet formation thereby increasing the effective surface area of the reaction mixture. Baffles, 27, on the inside surface of the reactor serve to improve mixing of the reaction mixture. The surface agitator comprises elongated members, 33, that are spatially ordered and activated so as to provide agitating forces to the surface of the reaction mixture. Without wishing to be bound by a particular theory of operation, it is believed that the success of the invention in reducing volatile monomer content in the vapor space of the reactor is due to the increased surface area available for reabsorption of the monomer.

The elongated members of the agitator assembly are desirably arranged to provide bracing and rigidity, and the agitator is symmetrically balanced with respect to the axis of rotation to reduce vibrational forces when in use. The elongated members preferably include bars projecting radially from the same shaft used to activate the stirring means of the reactor as well as bars arranged parallel to such shaft. The bars are joined together by welding, mechanical fastening or other means into a unitary structure. The arrangement of the individual elongated members is not critical to success as long as sufficient interruption of the reaction mixture's surface is attained.

The agitator may also include as a component thereof an impeller to cause vapors occupying the vapor space to be moved away from of towards the reaction mixture. Alternatively such an impeller may be remotely located in the vapor space and activated by a power source separate from the source used by the agitator. It should further be understood that whereas the present invention has been illustrated in a preferred embodiment with a common shaft for activating both the agitator and stirrer as previously described, separate means for powering the agitator and stirrer may also be employed.

The reactor and associated equipment, including the agitator, are constructed from steel, stainless steel, glass lined steel, or similar materials of construction. The agitator is generally rotated from 20 rpm to 300 rpm, preferably from 50 to 200 rpm so as to provide effective reduction in volatile monomer buildup within the reactor.

Process conditions for polymerizations, including free radical, cationic, anionic, condensation and coordination polymerizations are well known in the art. The polymerization may be conducted over a wide range of temperatures. Preferred temperatures are from 30° C. to 110° C., most preferably from 45° C. to 100° C. Any solvent or inert diluent may be employed in the solution polymerization. Examples include $C_{4-6}$ aromatic and aliphatic hydrocarbons such as, toluene, butane, pentane, hexane, cyclohexane, heptane, etc.

Preferred polymerization processes for which the present invention is especially suited are anionic polymerizations, especially such polymerizations utilized to prepare block copolymers of vinylaromatic- and conjugated diene monomers. In the preparation of such block copolymers any of three well known anionic polymerization techniques may be employed, including use of multifunctional initiators, sequential polymerization and coupling of living polymer anions. Monomer addition may occur before initiation of polymerization or continuously or incrementally after initiation.

The anionic initiator employed according to such an anionic process is not critical. Lithium alkyl compounds having from 2 to 6 carbons in the alkyl group, especially sec-butyl lithium and hydrocarbon soluble, difunctional lithium initiators are preferred. Suitable difunctional lithium initiators are well known and have been previously disclosed in the following U.S. Pat. Nos.: 4,169,115; 4,172,100; 4,172,190; 4,427,837; 4,196,154; and 4,205,016, the teachings of which are herein incorporated by reference.

Particularly desirable difunctional lithium containing compounds are selected from the group consisting of compounds corresponding to the formula:

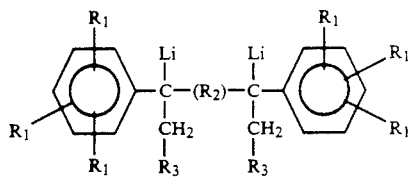

wherein
$R_1$ is independently each occurrence hydrogen or an inert radical having from 0 to 16 carbon atoms;
$R_2$ is a divalent organic radical having at least 6 carbon atoms, $R_2$ having at least one aromatic ring and the aromatic ring being directly attached to a carbon which is attached to an aromatic ring of the above formula.
$R_3$ is independently each occurrence selected from the group consisting of alkyl, cycloalkyl, aromatic, mixed alkyl/aromatic, and mixed cycloalkyl-/aromatic radicals containing from 1 to 20 carbon atoms. Especially preferred are initiating compounds of the formula:

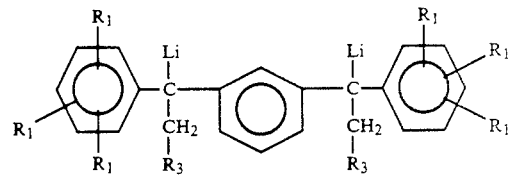

wherein $R_1$ and $R_3$ are as previously defined.

By the term "inert" as used in this context is meant substituents that do not interfere with the desired anionic polymerization. In a most preferred embodiment, $R_1$ is selected from the group consisting of hydrogen, alkyl, cycloalkyl, alkoxy, aryl and mixtures thereof. Specific examples of difunctional initiators (DFIs) corresponding to the above formula are 1,3-phenylene bis(3-methyl-1-phenylpentylidene)bis(lithium), 1,3-phenylene bis(3-methyl-1-(4-methylphenyl)pentylidene) bis(lithium), 1,3-phenylene bis(3-methyl-1-(4-ethylphenyl)-pentylidene) bis(lithium), 1,3-phenylene bis(3-methyl-1-(4-(1,1-dimethylethyl)phenyl)pentylidene) bis(lithium), and 1,4-phenylene bis(3-methyl-1-(4-dodecylphenyl)-pentylidene) bis(lithium).

Diene monomers suitable for use in the practice of the present invention include conjugated dienes, preferably 1,3-butadiene, isoprene and mixtures thereof. In addition to diene monomers, one or more olefin comonomers are additionally suitably employed. Any copolymerizable olefin comonomer may be employed. Preferred olefin comonomers are alkenyl aromatic monomers. By the term alkenyl aromatic monomer is meant a monomer of the formula:

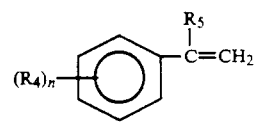

where n is an integer from 0 to 3, $R_4$ is an alkyl radical containing up to 5 carbon atoms and $R_5$ is hydrogen or methyl. Preferred alkenyl aromatic monomers are styrene, vinyl toluene (all isomers, alone or in admixture), α-methylstyrene, and mixtures thereof. Particularly preferred alkenyl aromatic monomers are styrene and mixtures of styrene and α-methylstyrene.

Monomer and solvent purities are carefully monitored. Purification by contacting with molecular sieves, distillation, degassing, etc. may be employed to remove water, oxygen, and other contaminants. Prior to addition of initiator, reactive impurities may be removed by "blanking", i.e., by addition of a small amount of lithium initiator to react with and remove the contaminant, but not enough to begin polymerization.

The polymerization is conducted for time periods suitable to achieve the desired product properties and conversions. Suitable reaction times are from 10 minutes to 3 hours, preferably from 20 minutes to 2 hours.

Having described the invention the following examples are provided as further illustrative and are not to be construed as limiting. Unless stated to the contrary all parts and percentages are based on weight.

EXAMPLE 1

A 400 gallon reactor operating approximately ⅔ full was equipped with a stirrer, inlet and outlets beneath the surface of the reactor contents and a condensor with a dip tube discharging condensed monomer in the vicinity of the inlet. Attached to the stirrer and rotating therewith was a surface agitator comprising an assembly of bars extending radially from the central stirrer shaft and connecting to axially disposed cross members in spaced relationship from the stirrer shaft. The surface agitator was positioned so as to extend above and below the surface of the reaction mixture and had a radius approximately equal to ⅔ of the internal reactor radius. When in operation the rotating surface agitator caused a large amount of spray and droplet formation. The reactor contents comprised 544 kg (1200 lbs) of 85/15 mixture of dry deoxygenated cyclohexane and isopentane under an atmosphere of dry nitrogen. To this mixture was then added 0.7 kg (1.6 lbs) of a 12 weight percent solution of sec-butyllithium in cyclohexane. The temperature of the mixture was adjusted to 63° C. and 12.4 kg (27.4 lbs) of dry, deoxygenated styrene was added. Polymerization of styrene was allowed to continue for 35 minutes until the residual styrene monomer was depleted. Then the temperature of the reaction mixture was raised to 69° C., and 64 kg (141 lbs) of dry, deoxygenated butadiene was added to the reaction mixture over the course of approximately 15 minutes. Fifteen, 30, and 45 minutes after starting addition of butadiene the reactor vapor space was sampled using a sample cylinder which was heated to >100° C. to avoid condensation of volatile monomer and solvent. The sample cylinder was purged with the reactor contents and the pressure equalized between the reactor and the cylinder. The temperature and pressure of the reaction mixture at the time of sampling was recorded. At the same time as the reactor vapor space was sampled, liquid samples of the reaction mixture were also obtained. Then to the reaction mixture was added 12.5 kg (27.5 lbs) of dry, deoxygenated styrene. The styrene was allowed to polymerize for 40 minutes. Then 90 grams of isopropanol was added to the reaction mixture to terminate the polymer chain ends. The samples were analyzed by external standard methods on a capillary gas chromatograph for butadiene content. Table 1 lists the results.

TABLE 1

| Sample Time | ppm Butadiene in Liquid | Butadiene Vapor Concentration g/liter |
| --- | --- | --- |
| 15 minutes | $8.5 \times 10^3$ | $6.7 \times 10^{-3}$ |
| 30 minutes | $1.1 \times 10^2$ | $1.9 \times 10^{-3}$ |
| 45 minutes | 8 | $2.6 \times 10^{-4}$ |

COMPARATIVE EXAMPLE

To the stirred reactor of Example 1 was added 665 kg (1466 lbs) of 85/15 mixture of dry deoxygenated cyclohexane and isopentane under an atmosphere of dry nitrogen. The volume of liquid was sufficient to fill the reactor approximately ⅞ full thereby covering the surface agitator and preventing interruption of the surface and spray formation during operation. To this mixture was then added 0.9 kg (2.0 lbs) of a 12 weight percent solution of sec-butyllithium in cyclohexane. The temperature of the mixture was adjusted to 62.5° C. and 15.1 kg (33.4 lbs) of dry, deoxygenated styrene was added. Polymerization of styrene was allowed to continue for 36 minutes until the residual styrene monomer was depleted. Then the temperature of the reaction mixture was raised to 71° C., and 78 kg (172 lbs) of dry, deoxygenated butadiene was added to the reaction mixture over the course of approximately 15 minutes. 15, 30, 45 and 60 minutes after beginning butadiene addition the reactor vapor space was sampled using a sample cylinder which was heated to >100° C. to avoid condensation of volatile monomer and solvent. The sample cylinder was purged with the reactor contents and the pressure equalized between the reactor and the cylinder. The temperature and pressure of the reaction mixture at the time of sampling was recorded. At the same time as the reactor vapor space was sampled, liquid samples of the reaction mixture were also obtained. Then to the reaction mixture was added 15.1 kg (33.4 lbs) of dry, deoxygenated styrene. The styrene was allowed to polymerize for 30 minutes. Then 112 grams of isopropanol was added to the reaction mixture to terminate the polymer chain ends. The samples were analyzed by external standard methods on a capillary gas chromatograph for butadiene content. Table 2 lists the results.

TABLE 2

| Sample Time | ppm Butadiene in Liquid | Butadiene Vapor Concentration g/liter |
| --- | --- | --- |
| 15 minutes | $3.9 \times 10^2$ | 0.43 |
| 30 minutes | 8 | 0.69 |
| 45 minutes | 1 | 0.46 |
| 60 minutes | 7 | 0.47 |

As may be seen by comparison of Tables 1 and 2 the use of the agitator significantly reduced accumulation of butadiene monomer in the reactor vapor space.

What is claimed is:

1. A reactor suitable for use in the solution polymerization of a liquid reaction mixture comprising a volatile monomer, said reactor comprising a vessel having a vapor space and fitted with an inlet, outlet, and stirring means immersed in a liquid reaction mixture, said reactor characterized by the presence of a mechanical agitation means that is a rigid structure attached to a common shaft with the stirring means comprising a multiplicity of solid, elongated, bars projecting radially from the common shaft used to activate the stirring means as well as bars arranged parallel to common shaft and intersecting the surface of the reaction mixture, whereby rotation of the mechanical agitation means interrupts the surface of the liquid reaction mixture so as to cause splashing and droplet formation thereby increasing the surface area available for vapor absorption and a reduction of volatile monomer concentration in the vapor space of the reactor.

2. A reactor according to claim 1 additionally comprising a condenser for condensing volatile components in the vapor space of the reactor.

* * * * *